United States Patent
Britton et al.

(10) Patent No.: US 7,792,912 B2
(45) Date of Patent: Sep. 7, 2010

(54) PRODUCT, METHOD AND SYSTEM FOR MANAGING MULTIPLE USER IDS IN INSTANT MESSAGING OR EMAIL COMPUTER SOFTWARE APPLICATIONS

(75) Inventors: Kathryn Heninger Britton, Chapel Hill, NC (US); Raquel Benita Bryant, Raleigh, NC (US); Esther Marie Burwell, Durham, NC (US); Qiana Nicole Eaglin, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/694,919

(22) Filed: Mar. 30, 2007

(65) Prior Publication Data

US 2008/0244014 A1 Oct. 2, 2008

(51) Int. Cl.
*G06F 15/16* (2006.01)

(52) U.S. Cl. .................. 709/206; 709/207; 715/752

(58) Field of Classification Search .......... 709/206, 709/207; 379/88.22; 715/752
See application file for complete search history.

(56) References Cited

U.S. PATENT DOCUMENTS

| 6,549,937 B1 | 4/2003 | Auerbach et al. | |
|---|---|---|---|
| 7,016,978 B2 | 3/2006 | Malik et al. | |
| 7,035,942 B2 | 4/2006 | Daniell et al. | |
| 7,058,036 B1 * | 6/2006 | Yu et al. | 370/335 |
| 7,283,620 B2 * | 10/2007 | Adamczyk | 379/88.13 |
| 7,484,213 B2 * | 1/2009 | Mathew et al. | 718/100 |
| 7,590,696 B1 * | 9/2009 | Odell et al. | 709/206 |
| 2004/0039807 A1 * | 2/2004 | Boveda De Miguel et al. | 709/223 |
| 2004/0158609 A1 | 8/2004 | Daniell et al. | |
| 2004/0221224 A1 | 11/2004 | Blattner et al. | |
| 2005/0069099 A1 | 3/2005 | Kozdon et al. | |
| 2005/0071434 A1 | 3/2005 | Hettish et al. | |
| 2005/0102365 A1 | 5/2005 | Moore et al. | |
| 2005/0108329 A1 | 5/2005 | Weaver et al. | |
| 2005/0210112 A1 | 9/2005 | Clement et al. | |
| 2005/0289470 A1 | 12/2005 | Pabla et al. | |
| 2006/0013205 A1 | 1/2006 | Daniell et al. | |
| 2006/0080130 A1 * | 4/2006 | Choksi | 705/1 |
| 2007/0130271 A1 * | 6/2007 | Ye et al. | 709/206 |
| 2008/0153459 A1 * | 6/2008 | Kansal et al. | 455/412.1 |

OTHER PUBLICATIONS

Author Unknown, Complete Messenger: Overview, Webpage/site: http://www.p2psharing.biz/completemes/, Printed from website on Mar. 30, 2007, p. 1, Published on the World Wide Web.

David F. Carr, What's Federated Identity Management?, eWeek, Webpage/site: http://www.eweek.com/article2/0,%201895,1378436,00%20.asp, Nov. 10, 2003, Ziff Davis Enterprise Holdings, Inc., Printed from website on Mar. 30, 2007, pp. 1-4, Published on the World Wide Web.

(Continued)

*Primary Examiner*—Frantz B Jean
(74) *Attorney, Agent, or Firm*—Lee Law, PLLC; Christopher B. Lee

(57) ABSTRACT

An invention is disclosed for enhancing communication with instant messaging (IM)/chat or email computer software applications by allowing a user to manage multiple user IDs by linking each different ID associated with that user thus allowing others to access that user regardless of the particular IM/chat or email system or account or session being accessed.

15 Claims, 4 Drawing Sheets

OTHER PUBLICATIONS

Author Unknown, Gaim 1.5.0, Webpage/site: http://gaim.sourceforge.net/about.php, Printed from website on Sep. 12, 2006, pp. 1-2, Published on the World Wide Web.

Author Unknown, Wikipedia, the free encyclopedia: Gaim, http://en.wikipedia.org/w/index/php?title=Gaim&printable=yes, Wikipedia Foundation, Inc., Printed from website on Aug. 3, 2006, pp. 1-3, Published on the World Wide Web.

Author Unknown, Welcome to IMTiger, Most Powerful add-on for MSN Messenger, Webpage/site: http://www.imtiger.com/, Jun. 5, 2005, IMTiger Software, Inc., Printed from website on Mar. 30, 2007, p. 1, Published on the World Wide Web.

Author Unknown, Jabber, Inc. Enterprise Intstant Messaging: Jabber XCP Features, Webpage/site: http://www.jabber.com/index.cgi?CONTENT_ID=569, Jabber, Inc., Printed from website on Mar. 30, 2007, pp. 1-3, Published on the World Wide Web.

Author Unknown, Kopete, The KDE Instant Messanger, Webpage/site: http://www.kopete.kde.org/, KDE e. V., Printed from website on Mar. 30, 2007, pp. 1-3, Published on the World Wide Web.

Author Unknown, Cerulean Studios—Learn about Trillian, Webpage/site: http://www.trillian.im/learn/, Cerulian Studios,Printed from website on Sep. 12, 2006, pp. 1-3, Published on the World Wide Web.

Author Unknown, Wikipedia, the free encyclopedia: Trillian (instant messaging client), http://en.wikipedia.org/w/index.php?title=Trillian_%instant_messaging_client%29 &printable=yes, Wikimedia Foundation, Inc., Printed from website on Aug. 3, 2006, pp. 1-9, Published on the World Wide Web.

* cited by examiner

PRODUCT, METHOD AND SYSTEM FOR MANAGING MULTIPLE USER IDS IN INSTANT MESSAGING OR EMAIL COMPUTER SOFTWARE APPLICATIONS

TECHNICAL FIELD

This invention relates to communication with instant messenger (IM)/chat and email computer software applications.

BACKGROUND

"Instant Messenger" (IM) or "chat" online services (such as Yahoo Instant Messenger®, MSN Messenger®, IBM Sametime®, AOL Automatic Instant Messaging (AIM)®, etc.) have become a primary mode of communication between computer users to allow instantaneous (or "real-time") conversation between them over networked mediums such as the Internet. IM/chat applications can often accommodate a wide range of uses ranging from corporate/business purposes to product support applications to personal and/or entertainment uses. However, current technology exhibits significant disadvantages relating to communications involving managing multiple IM user identification codes (user IDs) possessed by an individual user in cases where each ID is used for accessing a different IM/chat system and/or session.

Although certain IM/chat software products possess features that allow a sender to manage multiple user IDs for each person to whom a message is sent (receivers), no capability is provided for a receiver to manage his or her own multiple user IDs by linking each different ID regardless of the particular IM/chat or email system and/or session being accessed. For example, there is no mechanism for a message receiver to manage each of his or her different user IDs (i.e., if the MSN Messenger® ID for a user is "jdoe56" whereas the IBM Sametime® and Yahoo Instant Messenger® IDs are both "janedoe" and the AOL AIM® ID for that user is "janed") by linking (or "mapping") each user ID together to allow a message sender to access any of them irrespective of the IM/chat system or email account being used.

The concept of linking multiple user IDs to one contact alias is implemented from the message sender (but not the receiver) perspective in certain prior art IM/chat software products (such as Trillian, GAIM, IMTiger, Complete Messenger, Kopete, Federated Identity Management (FIM), Hailstorm and Jabber XCP, etc.) which lacks the advantage of requiring only the receiver to know and control mapping of his or her user IDs. The prior art also does not allow the receiver to configure the mappings to remove or restrict the use of any ID when necessary.

SUMMARY OF THE INVENTION

The invention enhances communication with instant messaging (IM)/chat or email computer software applications by allowing a user to manage multiple user IDs by linking different IDs associated with that user regardless of the particular IM/chat or email system or account or session being accessed.

Specifically, a product, method and system is provided for using IM/chat or email applications having a remote software service (such as an internet-based web service) configured for allowing a message recipient to manage multiple IM/chat or email accounts by linking user ID(s) for one or more accounts held by that recipient, so that a message sender can access any available recipient user ID for transmitting instant message(s) or email (irrespective of the IM/chat or email system or account being used) if at least one of the receiving client user IDs is known by the sending client software.

In operation, the sending client transmits a known recipient user ID to the server software, which then identifies other linked user IDs associated with that recipient in order to select an available IM/chat or email service or account to be used in contacting the recipient, by sending a message to each linked recipient user ID in turn until one succeeds or by broadcasting a message to all linked user IDs identified for accounts held by the recipient. The server contains features permitting an account owner to manage control of his or her IM/chat or email accounts (and their associated user IDs) by adding new IDs or by removing or placing restrictions on the use of existing IDs (such as blocking certain senders from being able to use a particular ID) in order to eliminate the need for a sender to know more than one user ID to contact a message or email receiver.

It is therefore an object of the present invention to enhance communication with instant messaging (IM)/chat or email computer software applications by allowing a user to manage multiple user IDs by linking different IDs associated with that user regardless of the particular IM/chat or email system or account or session being accessed.

It is another object of the present invention to provide a product, method and system for using IM/chat or email applications having a remote software service configured for allowing a message recipient to link user ID(s) for one or more IM/chat or email accounts held by that recipient, so that a message sender can access any available recipient user ID for transmitting instant message(s) or email to an account held by a recipient if at least one of the recipient user IDs is known by the sender.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
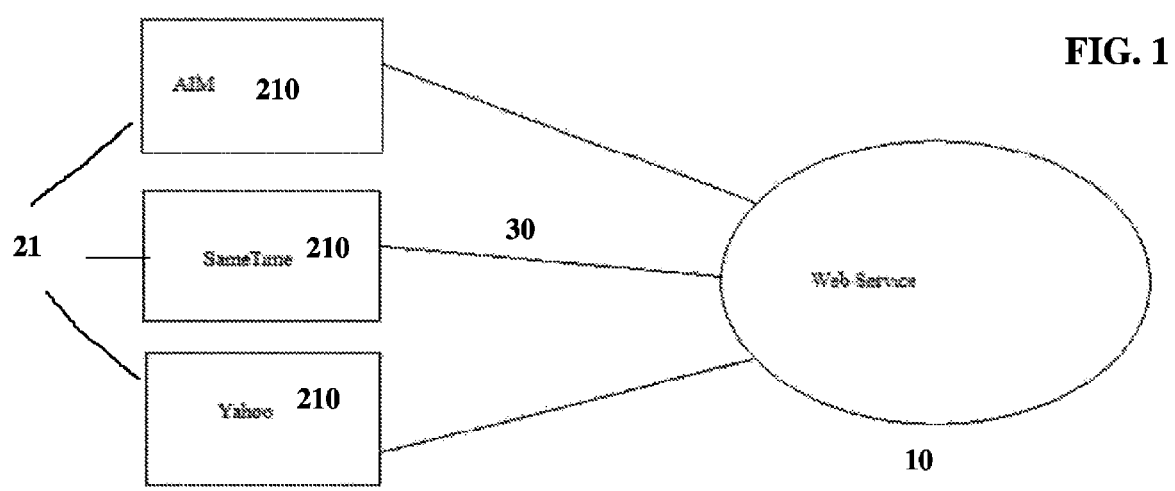
FIG. 1 illustrates the components of an instant messenger (IM)/chat or email computer software application according to the invention.

FIG. 1 illustrates a preferred embodiment of a software system for managing multiple instant messaging (IM)/chat or email user IDs by linking each different ID associated with an individual user, regardless of the particular IM/chat or email system and/or account and/or session being accessed. The system consists of a remote (such as an internet-based web) service 10 configured to operate in conjunction with one or more sending and receiving user interfaces (such as clients 20 and 21 respectively) in allowing a sender to contact a message recipient using a single ID. Depending on the configuration selected by the receiver, the service 10 can send a message to each linked user ID 210 associated with the receiver in turn until one succeeds, or it can broadcast a message to all linked user IDs 210 identified for any available IM/chat or email account held by the recipient.

Figure 2:
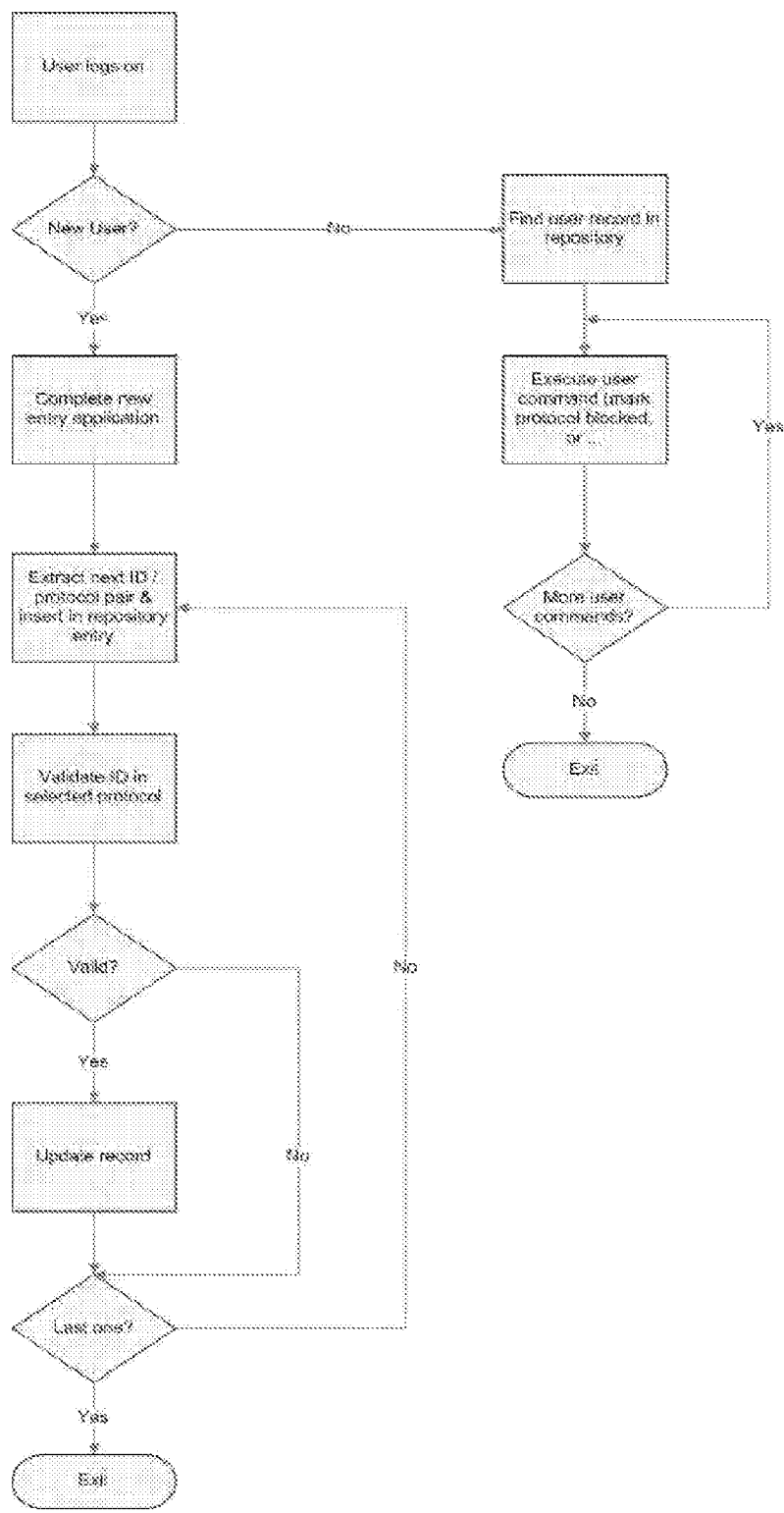
FIGS. 2 through 4 illustrate flowcharts outlining communication using an IM/chat or email software application of the invention.

By carrying out the processing steps shown in FIG. 2, the web service 10 can be configured to allow a message receiver 21 to manage multiple different IM/chat or email system accounts by linking any of the user ID(s) for one or more of the account(s) 210 together so that a message sender 20 can access any available recipient user ID 210 for transmitting instant message(s) or email to that recipient (irrespective of the IM/chat or email system or account or messaging protocol/format in use) even in cases where only one recipient user ID is known by the sender. In operation, the sending client 20 transmits a known recipient user ID 210 to the server software 10 to identify any other linked user IDs associated with that recipient 21 for selecting an available IM/chat or email service 30 or account to be used in contacting the recipient.

Figure 3:
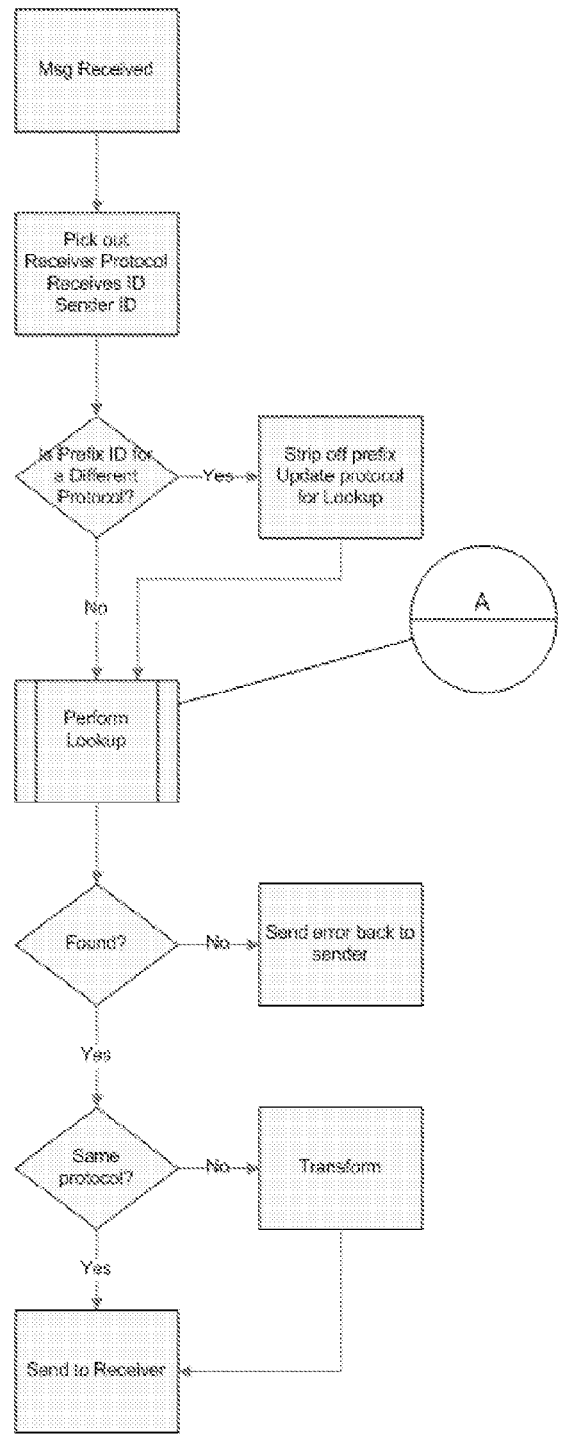
Figure 4:
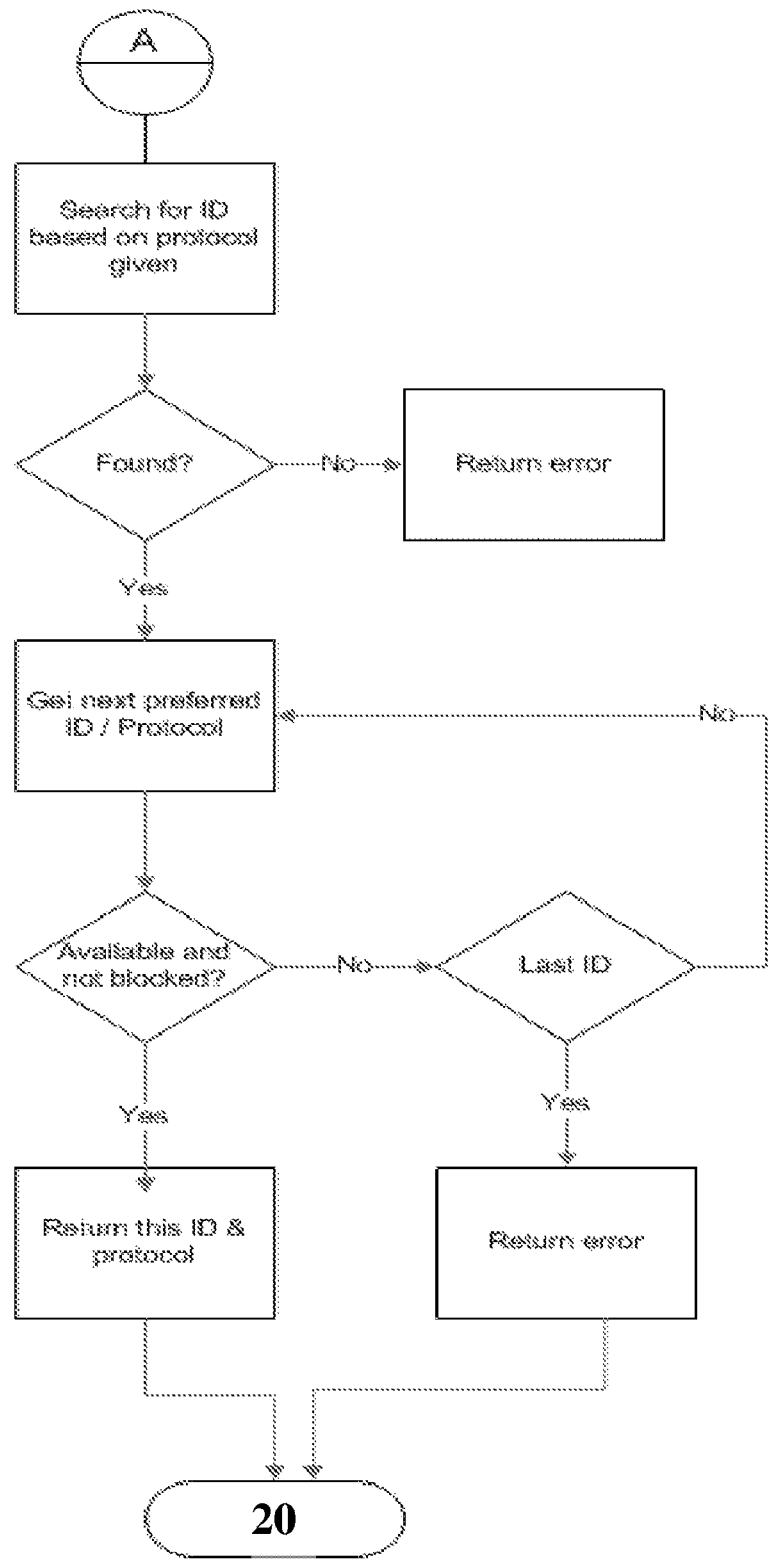

By carrying out the processing steps shown in FIGS. 3 & 4, the sending and receiving software clients 20 and 21 can communicate with each other by directly connecting to the same IM/chat or email service 30 in cases where a recipient user ID 210 known by the sender corresponds to an available user ID for that recipient. Otherwise, the web service 10 can be configured to act as a "mediator" by redirecting the message to an available on-line messaging service 30 corresponding to a linked user ID for an account 210 held by that recipient, by transforming the message protocol to match the receiving service.

The server software 10 contains commands permitting an account owner to manage control of all of his or her IM/chat or email user IDs 210 by (for example) adding new IDs or by removing or placing desired restrictions on the use of existing IDs. The system can also track periods of "idle" time when a recipient IM/chat or email account is not in use, in order to send message(s) to the recipient user ID associated with the account 210 exhibiting the least amount of idle time. When these features are utilized by a message recipient 21, the sender of the message 20 is not required to know each recipient user ID 210 (or to send individual messages to each ID) in order to contact the recipient.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A method, comprising:
   receiving at a server a plurality of user IDs associated with a message recipient, each user ID associated with a different messaging account;
   receiving at the server a first command from the message recipient to link a first user ID of the message recipient to at least a second user ID of the message recipient;
   linking the first user ID to at least the second user ID in response to the received first command;
   tracking idle time for each linked messaging account;
   receiving a message from a message sender, the message being directed to the first user ID of the message recipient; and
   sending the message to a user ID associated with one of the linked messaging accounts that exhibits a least idle time;
   wherein the message recipient controls management of its own user IDs via the first command received at the server, such that the message sender only needs to know one of the user IDs of the message recipient.

2. The method of claim 1, further comprising sending the message to the first user ID of the message recipient, where the message is sent to at least the first and second user IDs of the message recipient.

3. The method of claim 1, where the first user ID is associated with a first messaging account having a first message protocol, the second user ID is associated with a second messaging account having a second message protocol, and the message from the message sender is received by the server in the first message protocol, and further comprising transforming the message from the first message protocol to the second message protocol, where the message is sent to the second user ID in the second message protocol.

4. The method of claim 1, further comprising receiving at the server a second command from the message recipient to cause the server to block the message from being sent to a select one of the plurality of user IDs.

5. The method of claim 1 where, in the event the message as sent to the second user ID does not succeed, the method further comprises successively sending the message to other one's of the plurality of user IDs until the message succeeds.

6. A computer program product, the computer program product comprising a computer readable storage medium including a computer readable program, where the computer readable program when executed on a computer causes the computer to:
   receive at the computer a plurality of user IDs associated with a message recipient, each user ID associated with a different messaging account;
   receive at the computer a first command from the message recipient to link a first user ID of the message recipient to at least a second user ID of the message recipient;
   link the first user ID to at least the second user ID in response to the received first command;
   track idle time for each linked messaging account;
   receive a message from a message sender, the message being directed to the first user ID of the message recipient; and
   send the message to a user ID associated with one of the linked messaging accounts that exhibits a least idle time.

7. The computer program product of claim 6, where the computer readable program when executed on the computer further causes the computer to send the message to the first user ID of the message recipient, where the message is sent to at least the first and second user IDs of the message recipient.

8. The computer program product of claim 6, where the first user ID is associated with a first messaging account having a first message protocol, the second user ID is associated with a second messaging account having a second message protocol, and the message from the message sender is received by the computer in the first message protocol, and the computer readable program when executed on the computer further causes the computer to transform the message from the first message protocol to the second message protocol, where the message is sent to the second user ID in the second message protocol.

9. The computer program product of claim 6, where the computer readable program when executed on the computer further causes the computer to receive at the computer a second command from the message recipient to cause the computer to block the message from being sent to a select one of the plurality of user IDs.

10. The computer program product of claim 6 where, in the event the message as sent to the second user ID does not succeed, the computer readable program when executed on the computer further causes the computer to successively send the message to other one's of the plurality of user IDs until the message succeeds.

11. A system, comprising:
   an interface for sending and receiving information; and
   a computer programmed to:

receive, via the interface, a plurality of user IDs associated with a message recipient, each user ID associated with a different messaging account;

receive, via the interface, a first command from the message recipient to link a first user ID of the message recipient to at least a second user ID of the message recipient;

link the first user ID to at least the second user ID in response to the received first command;

track idle time for each linked messaging account;

receive, via the interface, a message from a message sender, the message being directed to the first user ID of the message recipient; and send, via the interface, the message to a user ID associated with one of the linked messaging accounts that exhibits a least idle time.

12. The system of claim 11, where the computer is further programmed to send, via the interface, the message to the first user ID of the message recipient, where the message is sent to at least the first and second user IDs of the message recipient.

13. The system of claim 11, where the first user ID is associated with a first messaging account having a first message protocol, the second user ID is associated with a second messaging account having a second message protocol, and the message from the message sender is received in the first message protocol, and where the computer is further programmed to transform the message from the first message protocol to the second message protocol, where the message is sent to the second user ID in the second message protocol.

14. The system of claim 11, where the computer is further programmed to receive, via the interface, a second command from the message recipient to cause the computer to block the message from being sent to a select one of the plurality of user IDs.

15. The system of claim 11 where, in the event the message as sent to the second user ID does not succeed, the computer is further programmed to successively send, via the interface, the message to other one's of the plurality of user IDs until the message succeeds.

* * * * *